United States Patent
Benson et al.

(10) Patent No.: US 9,506,557 B2
(45) Date of Patent: Nov. 29, 2016

(54) GEAR BLOCKOUT FOR A MANUAL TRANSMISSION

(71) Applicants: Robert A Benson, Bloomfield Hills, MI (US); Lawrence K Laba, Lake Orion, MI (US); Eugene H Polan, Jr., Madison Heights, MI (US)

(72) Inventors: Robert A Benson, Bloomfield Hills, MI (US); Lawrence K Laba, Lake Orion, MI (US); Eugene H Polan, Jr., Madison Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 58 days.

(21) Appl. No.: 14/307,595

(22) Filed: Jun. 18, 2014

(65) Prior Publication Data

US 2014/0373661 A1    Dec. 25, 2014

Related U.S. Application Data (60) Provisional application No. 61/836,714, filed on Jun. 19, 2013.

(51) Int. Cl.
| | | |
|---|---|---|
| *F16H 61/18* | (2006.01) | |
| *F16H 59/04* | (2006.01) | |
| *F16H 61/22* | (2006.01) | |
| *F16H 61/16* | (2006.01) | |

(52) U.S. Cl.
CPC ............ *F16H 59/04* (2013.01); *F16H 59/042* (2013.01); *F16H 61/18* (2013.01); *F16H 61/22* (2013.01); *F16H 2061/166* (2013.01); *Y10T 74/20085* (2015.01)

(58) Field of Classification Search
None
See application file for complete search history.

(56) References Cited

U.S. PATENT DOCUMENTS

| | | | |
|---|---|---|---|
| 4,693,135 A | 9/1987 | Larocca et al. | |
| 5,101,680 A | 4/1992 | Parsons | |
| 5,415,056 A * | 5/1995 | Tabata ............... | F16H 59/0204 74/335 |
| 8,556,772 B2 | 10/2013 | Biallas | |
| 2004/0031345 A1 | 2/2004 | Choi | |
| 2006/0052217 A1 | 3/2006 | Maxon | |
| 2012/0297913 A1 | 11/2012 | Biallas | |

FOREIGN PATENT DOCUMENTS

DE     102010036389 A1    1/2012

OTHER PUBLICATIONS

International Search Report and Written Opinion dated Sep. 16, 2014 for International Application No. PCT/US2014/042902, International Filing Date Jun. 18, 2014.

* cited by examiner

*Primary Examiner* — Erin D Bishop
(74) *Attorney, Agent, or Firm* — Ralph E. Smith (57) ABSTRACT

A shifter assembly for a manual transmission includes a shifter housing, a shift lever and a gear blockout. The shift lever includes a shift plane select member configured to move to a first and second gear shift plane and a gear engagement member configured to move along the first and second gear shift plane to a first gear position. The shift plane select member and the gear engagement member are each operatively coupled to the transmission. The gear blockout is positioned within the shifter housing and configured to be selectively actuated to (i) block movement of the shift plane select member to the shift plane position thereby preventing the manual transmission from being shifted into first and second gears, and (ii) block movement of the gear engagement member to the first gear position thereby preventing the manual transmission from being shifted into first gear.

18 Claims, 5 Drawing Sheets

GEAR BLOCKOUT FOR A MANUAL TRANSMISSION

CROSS-REFERENCE TO RELATED APPLICATIONS

This application claims benefit of U.S. Provisional Application Ser. No. 61/836,714 filed on Jun. 19, 2013. The disclosure of the above application is incorporated herein by reference in its entirety.

FIELD

The present disclosure relates generally to a manual transmission for a motor vehicle and, more particularly, to a gear blockout for a manual transmission.

BACKGROUND

Conventional manual transmissions and associated shift mechanisms generally permit an operator of the vehicle to shift from second gear to first gear when it is desired or appropriate to shift from second gear to third gear. Similarly, these manual transmissions and associated shift mechanisms also permit the vehicle operator to downshift from fourth gear to first gear when it is desired or appropriate to downshift to third gear. Either of these shift scenarios can dramatically increase the clutch disk speed leading to a shorter life cycle and/or a clutch burst condition. In some manual transmissions, attempts have been made to incorporate inhibitor arrangements into or onto the manual transmission that block movement of a shift finger in the guide plate housed within the manual transmission. While these inhibitor arrangements may work for their intended purpose, they are difficult to package within or onto the transmission housing due to packaging constraints associated with vehicle powertrains thereby adding cost and complexity to the design and manufacturing of the manual transmission. Thus, there remains a need for improvement in the relevant art.

SUMMARY

In one aspect, a shifter assembly for a manual transmission is provided in accordance with the teachings of the present disclosure. In an exemplary implementation, the shifter assembly includes a shifter housing, a shift lever and a gear blockout. The shifter housing is, in an exemplary implementation, adapted to be positioned remote from the manual transmission in an interior of a vehicle. The shift lever is, in an exemplary implementation, pivotably supported relative to the housing. The shift lever includes, in an exemplary implementation, a shift plane select member and a gear engagement member each adapted to be operably coupled to the manual transmission. The shift plane select member is adapted to, upon movement of the shift lever in a first direction to a first and second gear shift plane, move to a shift plane position to facilitate the transmission shifting into first or second gear. The gear engagement member is adapted to, upon movement of the shift lever in a second direction along the first and second gear shift plane to a first gear position, shift the transmission into first gear. The gear blockout is, in an exemplary implementation, positioned within the shifter housing and configured to be selectively actuated to (i) block movement of the shift plane select member to the shift plane position thereby preventing the manual transmission from being shifted into first and second gears, and (ii) block movement of the gear engagement member to the first gear position thereby preventing the manual transmission from being shifted into first gear.

In another aspect, a system for preventing selection of gears of a manual transmission is provided in accordance with the teachings of the present disclosure. In an exemplary implementation, the system includes a shifter housing, a shift lever, a gear blockout and a controller. The shifter housing is, in an exemplary implementation, adapted to be positioned remote from the manual transmission in an interior of a vehicle. The shift lever is, in an exemplary implementation, pivotably supported relative to the housing. The shift lever includes, in an exemplary implementation, a shift plane select member and a gear engagement member each adapted to be operably coupled to the manual transmission. The shift plane select member is adapted to, upon movement of the shift lever in a first direction to a first and second gear shift plane, move to a shift plane position to facilitate the transmission shifting into first or second gear. The gear engagement member is adapted to, upon movement of the shift lever in a second direction along the first and second gear shift plane to a first gear position, shift the transmission into first gear. The gear blockout is, in an exemplary implementation, positioned within the shifter housing. The controller is, in an exemplary implementation, configured to control the gear blockout to be selectively actuated to (i) block movement of the shift plane select member to the shift plane position thereby preventing the manual transmission from being shifted into first and second gears, and (ii) block movement of the gear engagement member to the first gear position thereby preventing the manual transmission from being shifted into first gear.

In some implementations, the gear blockout is configured to be selectively actuated to (i) block movement of the shift plane select member to the shift plane position thereby preventing the manual transmission from being shifted into first and second gears based on an upper predetermined speed threshold, and (ii) block movement of the gear engagement member to the first gear position while allowing movement to a second gear position thereby preventing the manual transmission from being shifted into first gear based on a lower predetermined speed threshold less than the upper predetermined speed threshold.

In some implementations, the gear blockout includes a shift plane blockout device and a gear engagement blockout device. In an exemplary implementation, the shift plane blockout device is configured to be actuated at the upper predetermined speed threshold to block the movement of the shift plane select member to the shift plane position. In an exemplary implementation, the gear engagement blockout device is configured to be actuated at the lower predetermined speed threshold to block the movement of the gear engagement member to the first gear position while allowing movement to the second gear position. In an exemplary implementation, the shift plane blockout device is configured to be selectively actuated based on the speed threshold and a signal from a shift lever position sensor or a clutch position sensor indicative of an upcoming transmission shift. In an exemplary implementation, the gear engagement blockout device is configured to be actuated based on the lower speed threshold and a signal from a shift lever position sensor or a clutch position sensor indicative of an upcoming transmission shift.

In some implementations, the gear engagement blockout device is configured to be actuated while the shift plane blockout device is configured to be deactivated at the lower predetermined speed threshold thereby permitting the shift lever to move to the first and second gear shift plane and the_ shift plane select member to move to the shift plane position and permitting the shift lever to move to the second gear position while preventing the shift lever from moving to the first gear position.

In some implementations, the shift plane and gear engagement blockout devices comprise electromechanical devices. In some implementations, the electromechanical devices comprise solenoid devices. In some implementations, the electromechanical devices comprise electromechanical cam devices.

In some implementations, the upper predetermined speed threshold is an upper vehicle speed threshold and the lower predetermined speed threshold is a lower vehicle speed threshold. In some implementations, the upper predetermined speed threshold is an upper engine speed threshold and the lower predetermined speed threshold is a lower engine speed threshold.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIGS. 4A-5B are partial perspective views of the shifter assembly having exemplary gear blockout arrangements according to the principles of the present disclosure.

DESCRIPTION

Figure 1A:
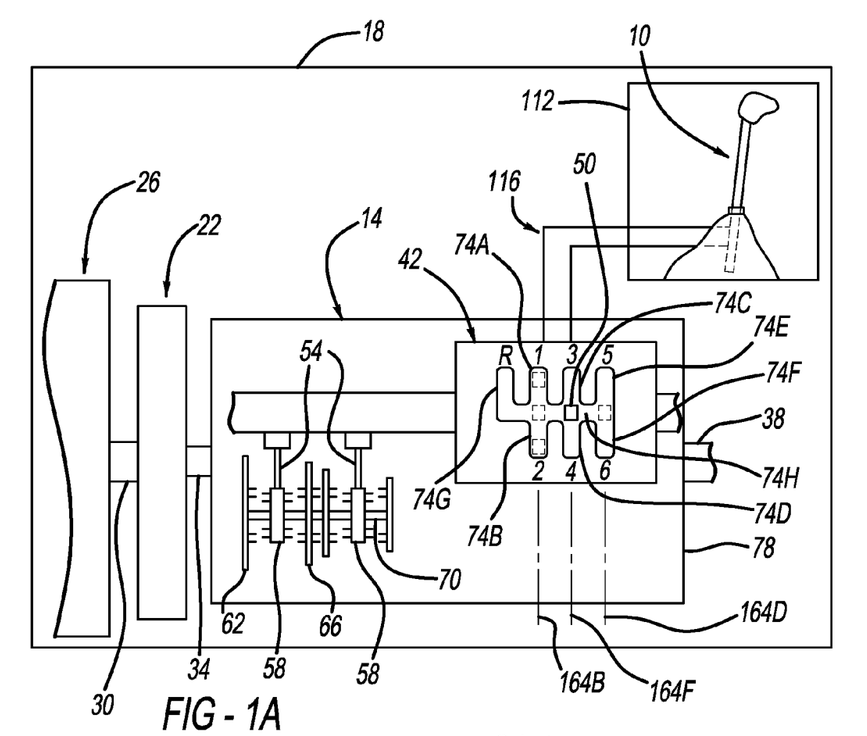
FIG. 1A is a schematic illustration of an exemplary shifter assembly operably coupled to an exemplary manual transmission of a motor vehicle according to the principles of the present disclosure.

Referring now to the drawings, where like reference numerals refer to like components or features, an exemplary shifter assembly is schematically shown and generally identified at reference numeral 10 in FIG. 1A. The shifter assembly 10 is operably coupled to a manual transmission 14 of an associated vehicle 18. The manual transmission 14 is coupled to a clutch 22, which is coupled to a prime mover 26, such as an engine. In accordance with various aspects of the present disclosure, the shifter assembly 10 includes a gear blockout for preventing a shift lever of the shifter assembly from being manipulated to select first gear or first and second gears of the manual transmission. In some implementations, and as will be discussed in greater detail below, the gear blockout is housed within a housing of the shifter assembly positioned in an interior of the vehicle. Positioning the gear blockout in the shifter assembly advantageously utilizes existing space in the shifter housing and provides for a more favorable (e.g., less harsh) operating environment for the gear blockout as compared to inhibitor arrangements positioned within or on a housing of a manual transmission.

Continuing with reference to FIG. 1A, the manual transmission 14 includes, among various other features and components known to one of ordinary skill in the art, the friction clutch 22 is operably disposed between an output 30 of the engine 26 and a transmission input shaft 34 and output shaft 38. Manual transmission 14 also includes, in the example illustrated, an optional shift gate 42 or similar member coupled to or formed with a shift cylinder or similar member. A shift actuation shaft 46 or similar member operable associated with the shift cylinder and includes a location pin or finger 50 that extends into shift gate 42, as shown for example in FIG. 1A.

A plurality of shift forks 54 are operatively associated with the shift actuation member 46 at various locations to engage and translate synchronizer clutches 58. In the example illustrated, each of the synchronizer clutches 58 are associated with one or more gears, for example first and second gears 62, 66, that are positioned on the same or different shafts 70. The transmission shaft gate 42 defines a plurality of spaced apart channels or slots 74A, 74B, 74C, 74D, 74E, 74F and 74G that can be arranged circumferentially in or on the outside surface of the shift cylinder and which are connected by a central longitudinal or axial channel 74H (collectively channels or slots 74).

The location finger 50 can be mounted to the shift actuation member 46 or another suitable component within a transmission housing 78 and can extend radially or outwardly into the channels 74. The location finger 50 and the transmission shift gate 42 cooperate to guide and control the motion of the shift actuation member 46. This motion corresponds to the motion of the shifter assembly 10 for engaging the various forward and reverse gears of the manual transmission 14, as can be appreciated by one of ordinary skill in the art. It will also be appreciated that the foregoing discussion of manual transmission 14 is exemplary and for illustrative purposes only and various other manual transmission configurations are well within the scope of the present disclosure.

With continuing reference to FIG. 1A and additional reference to FIGS. 1B-2B, an example of shifter assembly 10 will now be discussed in greater detail. The shifter assembly 10 includes, in one exemplary implementation, a shifter housing 104 and a shift lever assembly 108 pivotable relative to housing 104. The shifter assembly 10, in one exemplary implementation, is positioned in an interior 112 (FIG. 1A) of vehicle 18 remote from manual transmission 14 and is operably coupled to manual transmission 14 using an exemplary two cable or link system 116. In one exemplary implementation, the shift lever assembly 108 includes a shift lever 120, a shift knob 124, a pivot 128, a gear engagement member or portion 132 and a shift plane or fork select member or portion 136.

Figures 2A, 2B:
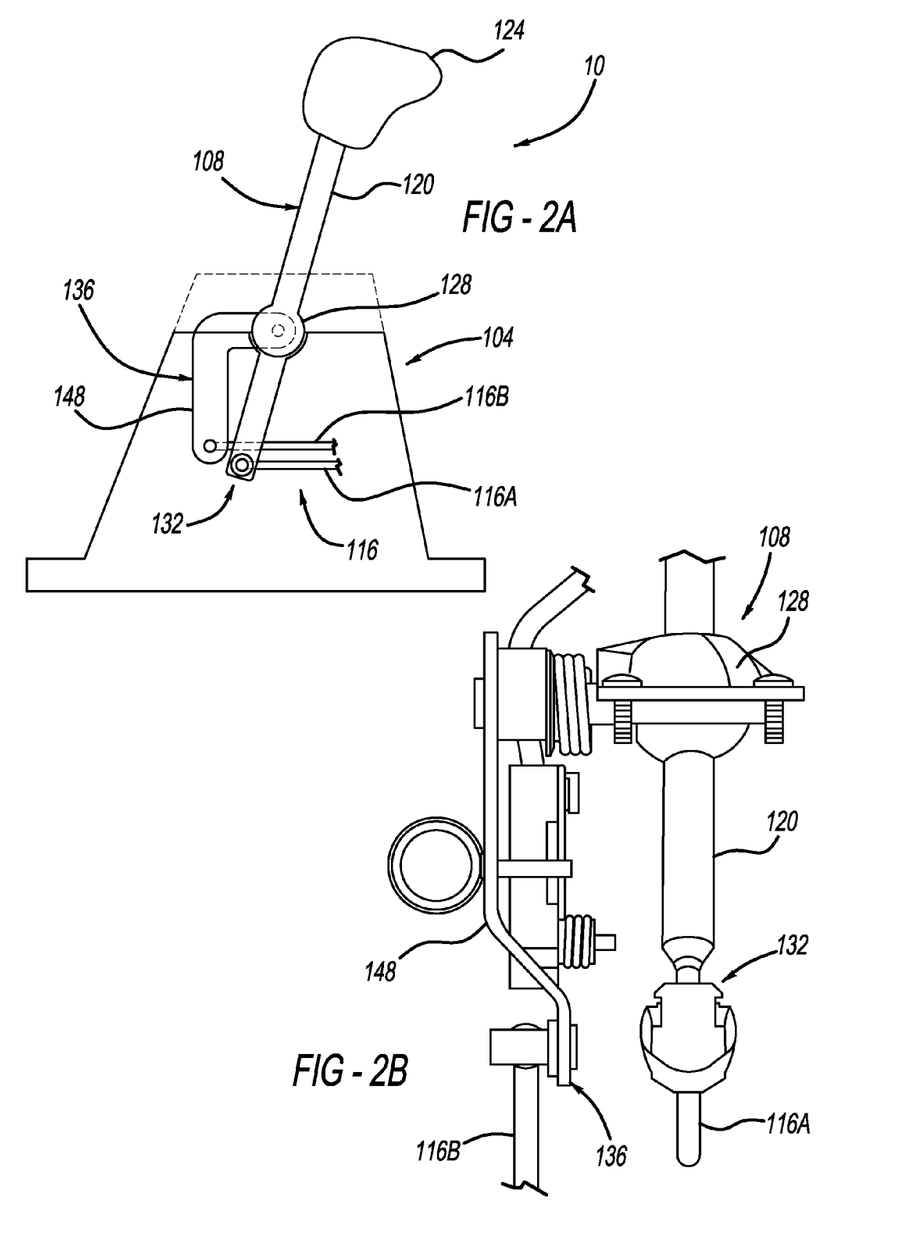
FIG. 2A is a schematic illustration of the exemplary shifter assembly of FIG. 1 according to the principles of the present disclosure.
FIG. 2B is a view of an exemplary shift lever assembly of the shifter assembly according to the principles of the present disclosure.
Figure 3:
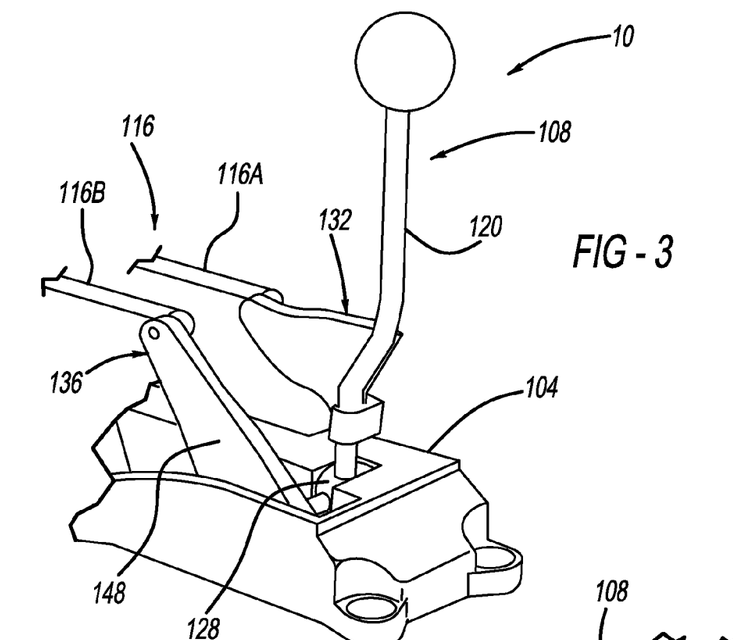
FIG. 3 is a perspective view of a shifter assembly illustrating an exemplary lower pivot arrangement according to the principles of the present disclosure.

In the exemplary implementation shown in FIGS. 2A and 2B, the shift lever assembly 108 includes a central or intermediate pivot 128 supported by and/or in the housing 104. In the exemplary implementation shown in FIG. 3, the shift lever assembly 108 includes a bottom pivot 128 supported by housing 104. In both examples, the pivot 128 is shown as an exemplary ball pivot supported in a corresponding socket defined by or coupled to housing 104. The shift knob 124 is positioned on an upper or top portion of the shift lever 120 spaced from housing 104 and configured to be grasped by a vehicle driver to input the motion required to engage the various gears of manual transmission 14.

In one exemplary implementation, the gear engagement member 132 includes a portion of the shift lever 120 coupled directly or indirectly to a shift cable or link 116A of the two cable system 116. In the illustrated examples, the shift cable 116A is coupled directly to a lower or bottom portion of the shift lever 120 in FIGS. 2A and 2B, and indirectly to an intermediate portion of shift lever 120 via a bracket or member 144 in the example shown in FIG. 3. The shift plane select member 136 includes a bracket (e.g., bell crank) or similar member 148 operatively coupled to the shift lever 120 and to a select cable or link 116B of the two cable system 116.

Figure 1B:
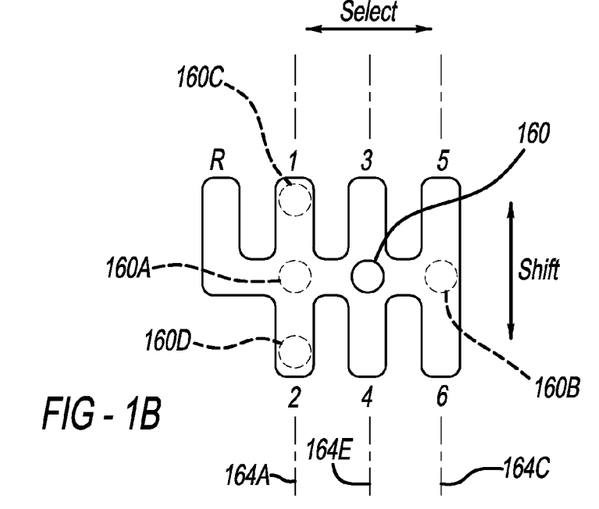
FIG. 1B is a schematic illustration of an exemplary shift lever shift pattern and associated exemplary movement of a shift lever according to the principles of the present disclosure.

With particular reference to FIG. 1B and continuing reference to FIGS. 1A and 2A-3, operation of the shifter assembly 10 will now be briefly discussed. In general, shifter assembly 10 can be operated in accordance with conventional shifter assembly operation where the shift lever assembly 108 generally resides in a home or neutral position illustrated at 160 in FIG. 1B. Lateral or cross-car movement of shift lever 120 correspondingly moves shift plane select member 136, which correspondingly moves associated select cable 116B. In the example illustrated in FIGS. 1A and 2A, laterally moving shift lever 120 from a neutral position 160 to the left or driver side of the vehicle 18 to a position 160A in a first and second gear shift plane 164A, moves the shift plane select member 136 in a first (e.g., rearward) direction and the shift finger 50 to a first and second gear shift plane 164B. This action, as can be appreciated by those skilled in the art, operatively associates the shift lever 120 with the shift fork 54 associated with first and second gears 62, 66 in the example manual transmission 14 configuration discussed above.

Continuing with this example, movement of the shift lever 120 in the opposite lateral direction moves the shift lever 120 to a position 160B in a fifth and sixth gear shift plane 164C and the shift plane select member 136 in a second opposite direction (e.g., forward). This correspondingly moves the shift finger 50 to a fifth and sixth gear shift plane 164D. As can be seen in FIG. 1B, the neutral position 160 is in the shift lever third and fourth gear shift plane 164E and the transmission plate shift plane 164F.

Once a shift plane has been selected in the exemplary manner discussed above, forward or rearward movement of the shift lever 120 in that shift plane engages the gears associated with that shift plane. For example, and as will be readily appreciated by those skilled in the art, movement of the shift lever 120 in a forward direction in the first and second gear shift plane 164A to a position 160C causes the gear engagement portion 132 to correspondingly move the shift cable 116A in the first direction, which causes the shift finger 50 to advance in slot 74A and the operatively associated shift fork 54 to facilitate engagement of first gear 62.

Movement of the shift lever 120 in the rearward or second direction in the first and second gear shift plane 164A to a position 160D causes the gear engagement portion 132 to correspondingly move the shift cable 116A in a second opposite direction, which causes the shift finger 50 to advance in slot 74B and the operatively associated shift fork 54 to facilitate engagement of second gear 66. Operation of the shift lever 120 to engage third and fourth gears associated with shift plane 164E and fifth and sixth gears associated with shift plane 164C is similar to that of shift plane 164A and will not be further discussed herein. It will also be appreciated that the shift pattern and associated shift planes discussed above and herein is exemplary and for illustrative purposes only and other shift patterns and numbers of gears associated with manual transmission 14 are well within the scope of the present disclosure.

As briefly mentioned above, selection of first 62 and/or second gear 66 of manual transmission 14 when the vehicle 18 and/or engine 26 speed is/are above one or more predetermined threshold(s) can damage the clutch and possible render the clutch inoperable, such as with a clutch burst condition. In this regard, and with additional reference to FIGS. 4A-6, a gear blackout 170 is incorporated into the shifter assembly 10 and configured, upon selective actuation, to prevent both first and second gears 62, 66 from being engaged or only first gear 62 from being engaged.

In one exemplary implementation, the gear blackout 170 is incorporated within the shifter assembly 10 and forms part of the shifter assembly 10. In this regard, the shifter assembly 10 can be provided, in this exemplary implementation, as an assembly including the incorporated gear blockout 170 to an original equipment manufacturer. In one exemplary implementation, the gear blockout 170 includes one or more electromechanical devices 174 configured to be controlled for selective actuation to block movement of the shift lever 120 associated with engagement of first or first and second gears 62, 66, as will be discussed in greater detail below.

Figure 6:
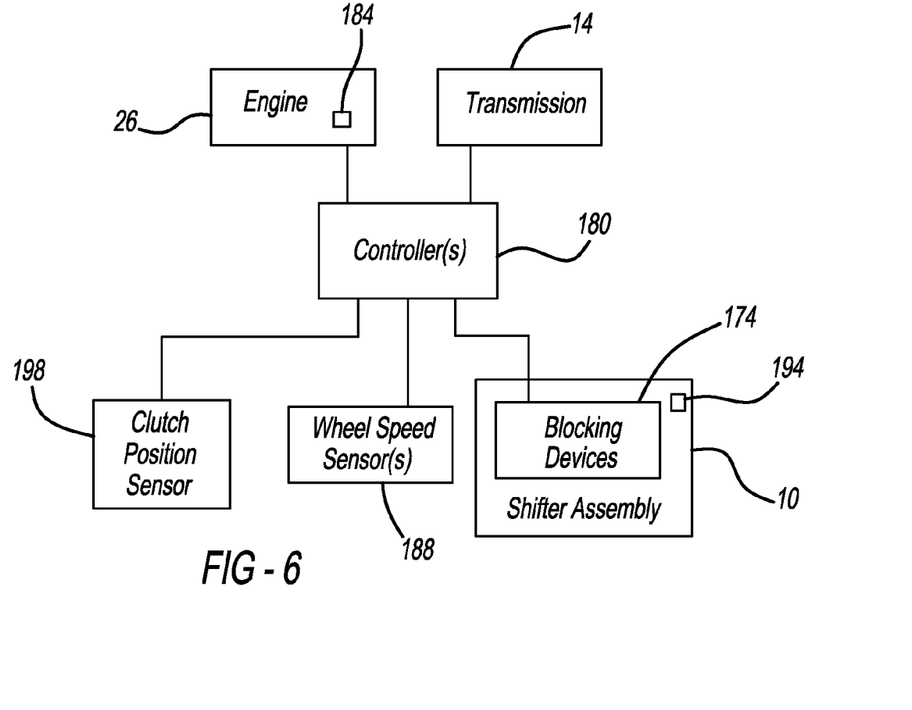
FIG. 6 is an example functional block diagram of a vehicle having a shifter assembly with a gear blockout according to the principles of the present disclosure.

With particular reference to FIG. 6, the one or more electromechanical devices 174 of the gear blockout 170 are in communication with and configured to be controlled by one or more controllers or control modules 180 of vehicle 18. It will be appreciated that while the discussion will continue with reference to the gear blockout 170 being in communication with a controller, the gear blockout 170 can be in communication with a single controller, multiple controllers, one or more control modules, and/or a controller area network (CAN) in communication with one or more controllers or control modules.

The controller 180 is also in communication with various vehicle components and/or sensors, including manual transmission 14 and associated sensors, a crankshaft speed sensor 184 of engine 26, and one or more wheel speed sensors 188. In one exemplary implementation, the wheel speed sensors 188 are associated with an anti-lock braking system (ABS) of vehicle 18. In addition to or in lieu of the wheel speed sensor(s), the controller 180 can be in communication with a vehicle speed sensor or similar sensor configured to provide vehicle speed data to controller 180. The controller 180 is also in communication with, in an exemplary implementation, a shift lever position sensor 194 and a clutch position sensor 198. In one exemplary implementation, the shift lever position sensor 194 is positioned in housing 104 and configured to sense a position of the shift lever 120 relative to the neutral position 160. In one exemplary implementation, the shift lever position sensor 194 is a neutral position sensor configured to provide data to controller 180 indicating whether shift lever 120 is in the neutral position 160 and/or passes through the neutral position 160. In one exemplary implementation, the clutch position sensor 198 includes a clutch pedal position sensor configured to provide data to controller 180 indicative of a position of a clutch pedal, such as whether the clutch pedal is in a depressed or non-depressed state.

In an exemplary implementation, the gear blockout 170 includes a first or shift plane electromechanical blockout device 190 and a second or gear engagement electromechanical blockout device 192. In an exemplary implementation, the gear blockout 170 includes two electromechanical gear engagement blockout devices 192. In one exemplary implementation, the electromechanical blockout devices 190, 192 include solenoid or cam devices configured to be selectively energized or actuated by controller 180 to move from a first or denergized position to a second or energized/actuated position which, in this exemplary implementation, would selectively block movement of the shift lever assembly 108, as will be discussed below in greater detail.

In one exemplary implementation, the controller 180 receives wheel speed data from wheel speed sensor(s) 188 and determines a speed of the vehicle. The controller 180 also receives engine speed data, such as revolutions per minute (RPM) from the crankshaft speed sensor 184. The controller 180 determines if the vehicle speed and/or engine speed is above one or more predetermined thresholds using the input from the wheel speed sensor(s) 188 and/or crankshaft speed sensor 184.

In one exemplary implementation and as briefly discussed above, one of the predetermined thresholds is a first or upper vehicle speed above which the gear blockout 170 is actuated by controller 180 to prevent the shift lever 120 and/or shift lever assembly 108 from entering into and/or moving in the first and second gear shift plane 164A, as will be discussed below in greater detail by way of examples. Another one of the thresholds is a second or lower vehicle speed above which the gear blockout 170 is actuated by controller 180 to prevent the shift lever 120 from moving in shift plane 164A to position 160C for engaging first gear 62. In this exemplary implementation, the shift lever 120 is not restricted from entering shift plane 164A and is not restricted from engaging second gear 66, but is only restricted from engaging first gear 62. In these examples, the second vehicle speed is lower than the first vehicle speed. In one exemplary implementation, the first vehicle speed threshold is between 50 and 60 MPH and the second vehicle speed threshold is between 30 and 40 MPH. In one particular example implementation, the first vehicle speed threshold is between 55 and 60 MPH and potentially 56 MPH. In this particular example implementation, the second vehicle speed threshold is between 35 and 40 MPH and potentially 37 MPH.

Figure 4A:
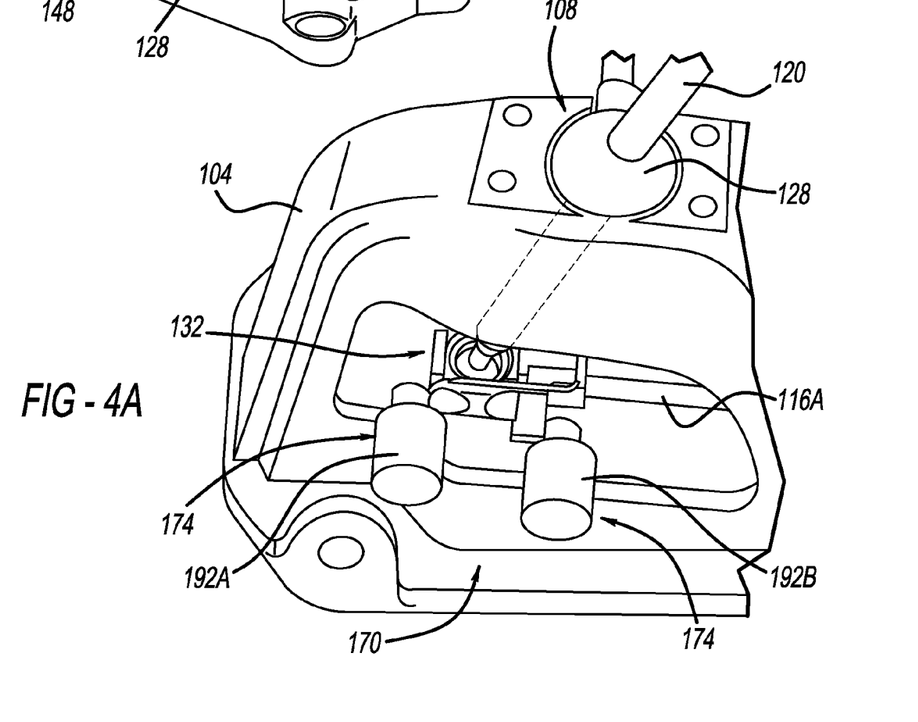
Figure 4B:
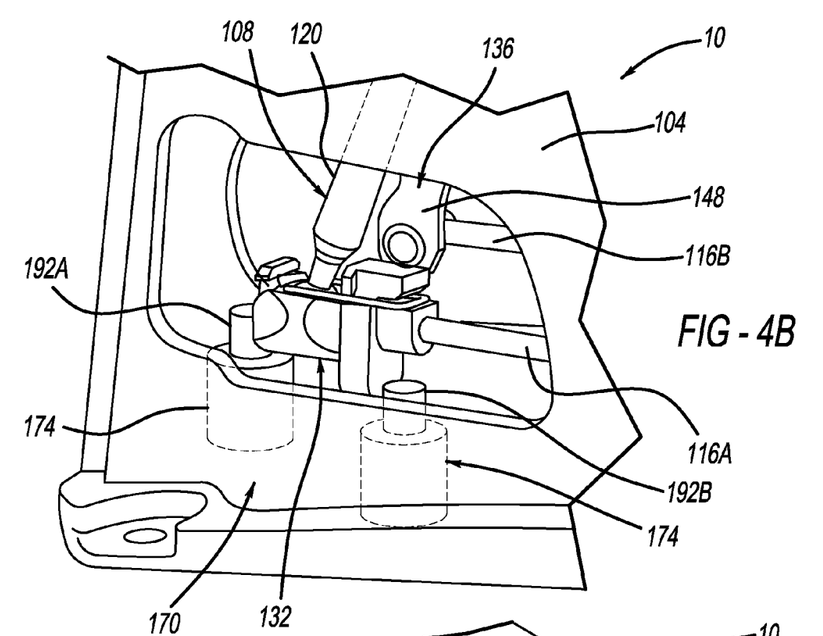

With particular reference to FIGS. 4A and 4B, the illustrated exemplary gear blockout 170 includes two gear engagement electromechanical blockout devices 192 configured to be selectively actuated by controller 180 to block movement of the shift lever 120 and/or associated gear engagement portion 132 to prevent engagement of first 62 and/or second gear 66. In this exemplary implementation, the two gear engagement blockout devices 192 are solenoid devices housed entirely within housing 104 of shifter assembly 10. The blockout devices 192 are positioned in shifter housing 104 along or relative to a longitudinal axis of shift plane 164A. As mentioned above, the blockout devices 192, when actuated, engage the shift lever 120 and/or the gear engagement portion 132. In this regard, the gear engagement portion 132 can be a portion of the shift lever 120 and/or a bracket or outer coupling member associated with the shift lever 120.

Continuing with reference to FIGS. 4A and 4B, a first block device 192A is positioned in the shifter housing 104 so as to block movement of shift lever 120 along shift plane 164A in a first direction associated with engagement of first gear 62 of manual transmission 14. In one exemplary implementation, the first direction is a rearward direction relative to vehicle 18. A second blockout device 192B (collectively blockout devices 192) is positioned in the shifter housing 104 so as to block movement of shift lever 120 along shift plane 164A in a second generally opposite direction associated with engagement of second gear 66 of manual transmission 14. In the exemplary implementation illustrated, the first direction is rearward and the second direction is forward relative to vehicle 18. It will be appreciated, however, that the first direction could a different direction, such as forward, depending on the orientation of the shifter assembly 10 in the vehicle and/or the pivot location on the shift lever 120. For example, with an intermediate pivot 128 (as shown in FIGS. 2A-2B and 4A-5B, forward movement of the shift lever 120 to select, for example, first gear 62 results in rearward movement of the follower portion of the shift lever 120 below the pivot 128. Conversely, for the bottom pivot 128 shift lever 120 configuration shown in FIG. 3, forward movement of the shift lever 120 can result in forward movement of the gear engagement portion 132.

Continuing with reference to FIGS. 4A-4B, the first blockout device 192A is selectively actuated by controller 180 when it is determined that the vehicle speed is above the second predetermined speed threshold, thereby preventing the shift lever 120 from engaging first gear 62 and thus the manual transmission 14 from shifting into first gear 62. If the vehicle speed is below the first predetermined threshold then the second blocking device 192B will not be actuated by controller 180 thereby permitting the shift lever 120 to engage second gear 66. If the controller 180 determines the vehicle speed is above the first predetermined threshold, then both the first and second blockout devices 192A, 192B are actuated thereby preventing the shift lever 120 from engaging both first and second gears 62, 66.

Figure 5A:
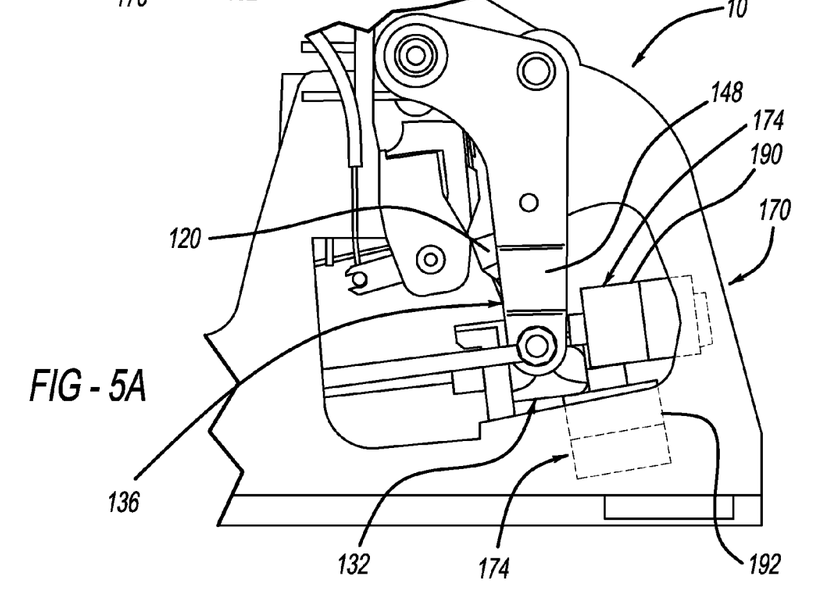
Figure 5B:
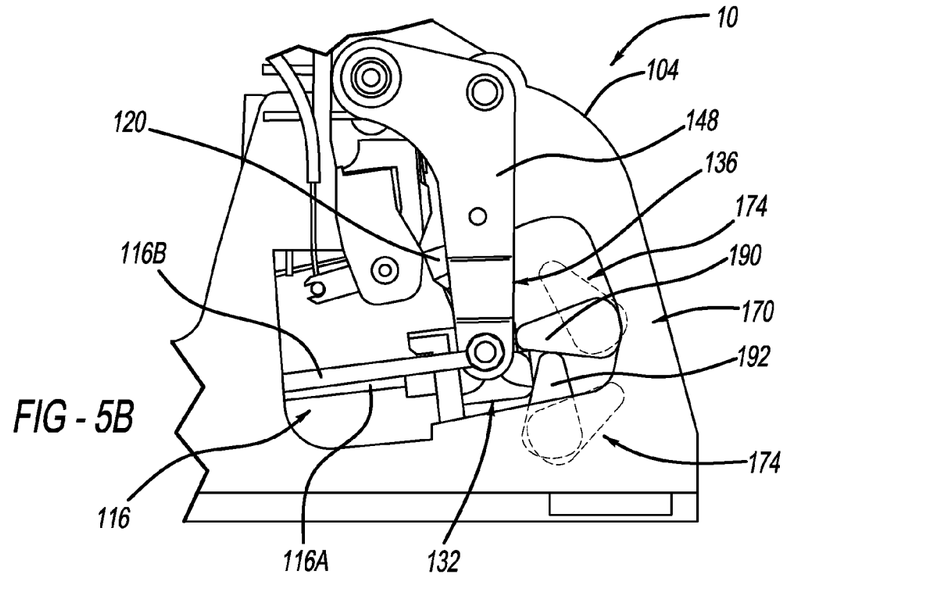

Turning now to FIGS. 5A-5B and with continuing reference to FIGS. 1-4B and 6, the gear blockout 170 includes a first or shift plane electromechanical blockout device 190 and a second or gear engagement electromechanical blockout device 192. In this exemplary implementation, the shift plane blockout device 190 and the gear engagement blockout device 192 are positioned in the housing 104. In one exemplary implementation, the gear engagement blockout device 192 is configured to align with the shift plane select member or portion 136 of shift lever 120. The gear engagement blockout device 192 is positioned within the housing 104 and configured to align with the gear engagement portion or member 132 of shift lever 120.

In operation, the shift plane blockout device 190 is configured to selectively block the shift lever 120 from being moved into the first and second gear shift plane 164A. For example, the shift plane blockout device 190 is selectively actuated by the controller 180 to block lateral or cross-car movement of the shift lever 120 from the neutral position 160 and/or from the shift plane 164C so as to prevent the shift lever 120 from being able to engage both first and second gears 62, 66 of the manual transmission 14.

In one exemplary implementation, the shift plane blockout device 190 is configured to selectively engage the shift plane select member 136 to prevent movement of the shift plane select member 136 in the first direction associated with lateral movement of the shift lever 120 into the first and second gear shift plane 164A. In this exemplary implementation, lateral movement of the shift lever 120 into the first and second gear shift plane 164A corresponds to first directional movement in the rearward direction relative to vehicle 18. It will be appreciated, however, that the first directional movement could also correspond to forward movement depending on, for example, orientations of the shifter assembly 10 and/or manual transmission 14.

In operation, upon determination that the vehicle speed is above the first predetermined threshold, the controller 180 actuates the shift plane blockout device 190, which prevents the shift lever 120 from moving to the first and second gear shift plane 164A, which prevents the manual transmission 14 from shifting into the first and second gears 62, 66. In the exemplary implementation illustrated in 5A, the shift plane blockout device 190 engages the shift plane select member 136, which is a bell crank member operatively associated with the shift lever 120. In this exemplary implementation, the actuated shift plane blockout device 190 prevents the bell crank member 136 from moving in the first direction associated with the shift lever 120 attempting to move into the shift plane 164A. In other words, the actuated shift plane blockout device 190 prevents the shift lever 120 from moving into the shift plane 164A by engaging and preventing the bell crank member 136 from moving in the first direction.

In an operating scenario where the vehicle speed is below the first predetermined speed threshold, or falls below the first predetermined speed threshold, the controller 180 will control the shift plane blockout device 190 to deactivate and thus allow the shift lever 120 to enter the first and second gear shift plane 164A. The controller 180 will, however, monitor the vehicle speed to determine whether the vehicle speed is above the second predetermined speed threshold. If the vehicle speed is above the second predetermined speed threshold, the controller 180 will control the gear engagement blackout device 192 to actuate and prevent the shift lever 120 from moving in a direction to engage first gear 62 (e.g., position 160C). In this implementation, the gear engagement blockout device 192 is positioned to align with the shift lever 120 being in the shift plane 164A and prevent the shift lever 120 from moving in the direction to engage first gear 62. In the exemplary implementation illustrated, this direction is the rearward direction relative to vehicle 18. By preventing the shift lever 120 from moving in the shift plane 164A in the direction to engage first gear 62, the transmission 14 is thereby prevented from shifting into first gear 62.

Thus, in this exemplary implementation, the controller 180 continuously monitors or receives input to determine the vehicle speed. If the vehicle speed is above the upper or first predetermined speed threshold, the controller 180 actuates the shift plane blockout device 190 thereby preventing the shift lever 120 from entering the first and second shift plane 164A in the exemplary manner discussed above. In this exemplary implementation, it is not necessary that the gear engagement blackout device 192 be actuated because the shift lever 120 is prevented from entering the first and second shift plane 164A and thus prevented from selecting both first and second gears 62, 66. Thus, in an exemplary implementation, the controller 180 actuates only the shift plane blockout device 190 upon determining that the vehicle speed is above the first predetermined threshold.

In an operating scenario where the controller 180 determines that the vehicle speed is below the first predetermined threshold but above the second predetermined threshold, the controller 180 can detect whether the shift plane blackout device 190 is actuated and, if so, deactivate the shift plane blockout device 190 while activating the gear engagement blockout device 192 thereby allowing the shift lever 120 to enter the shift plane 164A but not engage first gear 62. In other words, the shift lever 120 is not restricted from entering the first and second gear shift plane 164A, but is only permitted or provided unrestricted access to engage second gear 66. Upon the controller 180 determining that the vehicle speed falls below the second predetermined threshold, the controller 180 controls the gear engagement blackout device 192 to deactivate thereby permitting the shift lever 120 to move to the first gear engagement position 160C.

In an exemplary implementation, the controller 180 is configured to selectively actuate the gear blockout 170 based on the speed thresholds as well as input from one or both of the shift lever position sensor 194 and the clutch position sensor 198 indicative of an upcoming manual transmission shift. For example, the shift plane blockout device 190 can be controlled to be activated based on the upper speed threshold and a signal from i) the shift lever position sensor 194 indicating the shift lever 120 has passed through the neutral position 160 and/or ii) a signal from the clutch position sensor 198 indicating the clutch pedal has been depressed. Similarly, the gear engagement blockout device 192 can be controlled to be activated based on the lower speed threshold and input from the shift lever position sensor 194 and/or clutch position sensor 198. In this manner, the system can conserve energy by not automatically activating the shift plane blockout device 190 and/or the gear engagement blockout device 192 based on only or substantially only the relevant speed thresholds.

With particular reference to FIG. 5B and continuing reference to FIGS. 1A-5A and 6, another example of blocking devices for gear blockout 170 is shown. In the exemplary implementation illustrated, the gear blockout 170 includes electromechanical cam devices 190A and 192A configured to be selectively actuated in the same or substantially similar manner as the solenoid devices discussed above. In this regard, the cam blocking devices 190A and 192A function the same or substantially the same as blocking devices 190 and 192 to selectively block the first and second gear shift plane 164A and the first gear engagement position of shift lever 120, respectively.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A shifter assembly for a manual transmission, comprising:
a shifter housing adapted to be positioned remote from the manual transmission in an interior of a vehicle;
a shift lever pivotably supported relative to the housing, the shift lever including a shift plane select member and a gear engagement member each adapted to be operably coupled to the manual transmission, the shift plane select member adapted to, upon movement of the shift lever in a first direction to a first and second gear shift plane, move to a shift plane position to facilitate the transmission shifting into first or second gear, and the gear engagement member adapted to, upon movement of the shift lever in a second direction along the first and second gear shift plane to a first gear position, shift the transmission into first gear; and
a gear blackout positioned within the shifter housing, the gear blockout configured to be selectively actuated to (i) block movement of the shift plane select member to the shift plane position thereby preventing the manual transmission from being shifted into first and second gears, and (ii) block movement of the gear engagement member to the first gear position thereby preventing the manual transmission from being shifted into first gear.

2. The shifter assembly of claim 1, wherein the gear blockout is configured to be selectively actuated to (i) block movement of the shift plane select member to the shift plane position thereby preventing the manual transmission from being shifted into first and second gears based on an upper predetermined speed threshold, and (ii) block movement of the gear engagement member to the first gear position while allowing movement to a second gear position thereby preventing the manual transmission from being shifted into first gear based on a lower predetermined speed threshold less than the upper predetermined threshold.

3. The shifter assembly of claim 2, wherein the gear blackout includes a shift plane blockout device and a gear engagement blockout device, the shift plane blockout device configured to be actuated at the upper predetermined speed threshold to block the movement of the shift plane select member to the shift plane position, and wherein the gear engagement blockout device is configured to be actuated at the lower predetermined speed threshold to block the movement of the gear engagement member to the first gear position while allowing movement to the second gear position.

4. The shifter assembly of claim 3, wherein the gear engagement blockout device is configured to be actuated while the shift plane blockout device is configured to be deactuated at the lower predetermined speed threshold thereby permitting the shift lever to move to the first and second gear shift plane and the shift plane select member to move to the shift plane position and permitting the shift lever to move to the second gear position while preventing the shift lever from moving to the first gear position.

5. The shifter assembly of claim 3, wherein the shift plane and gear engagement blackout devices comprise electromechanical devices.

6. The shifter assembly of claim 5, wherein the electromechanical devices comprise solenoid devices.

7. The shifter assembly of claim 5, wherein the electromechanical devices comprise electromechanical cam devices.

8. The shifter assembly of claim 2, wherein the upper predetermined speed threshold is an upper vehicle speed threshold and the lower predetermined speed threshold is a lower vehicle speed threshold.

9. The shifter assembly of claim 2, wherein the upper predetermined speed threshold is an upper engine speed threshold and the lower predetermined speed threshold is a lower engine speed threshold.

10. A system for preventing selection of gears of a manual transmission, the system comprising:
a shifter housing adapted to be positioned remote from the manual transmission in an interior of a vehicle;
a shift lever pivotably supported relative to the housing, the shift lever including a shift plane select member and a gear engagement member each adapted to be operably coupled to the manual transmission, the shift plane select member adapted to, upon movement of the shift lever in a first direction to a first and second gear shift plane, move to a shift plane position to facilitate the transmission shifting into first or second gear, and the gear engagement member adapted to, upon movement of the shift lever in a second direction along the first and second gear shift plane to a first gear position, shift the transmission into first gear;
a gear blockout positioned within the shifter housing; and
a controller configured to control the gear blockout to be selectively actuated to (i) block movement of the shift plane select member to the shift plane position thereby preventing the manual transmission from being shifted into first and second gears, and (ii) block movement of the gear engagement member to the first gear position thereby preventing the manual transmission from being shifted into first gear.

11. The system of claim 10, wherein the controller is configured to selectively actuate the gear blockout based on: (i) an upper predetermined speed threshold to block movement of the shift plane select member to the shift plane position thereby preventing the manual transmission from being shifted into first and second gears, and (ii) a lower predetermined speed threshold less than the upper predetermined threshold to block movement of the gear engagement member to the first gear position while allowing movement to a second gear position thereby preventing the manual transmission from being shifted into first gear.

12. The shifter assembly of claim 11, wherein the gear blockout includes a shift plane blockout device and a gear engagement blockout device; and
wherein the controller is configured to: (i) selectively actuate the shift plane blockout device at the upper predetermined speed threshold to block the movement of the shift plane select member to the shift plane position, and (ii) selectively actuate gear engagement blockout device at the lower predetermined speed threshold to block the movement of the gear engagement member to the first gear position while allowing movement to the second gear position.

13. The shifter assembly of claim 12, wherein the controller is configured to, at the lower predetermined speed threshold, selectively actuate the gear engagement blockout device while controlling the shift plane blockout device to be deactuated thereby permitting the shift lever to move to the first and second gear shift plane and the shift plane select member to move to the shift plane position and permitting the shift lever to move to the second gear position while preventing the shift lever from moving to the first gear position.

14. The shifter assembly of claim 12, wherein the shift plane and gear engagement blockout devices comprise electromechanical devices.

15. The shifter assembly of claim 14, wherein the electromechanical devices comprise solenoid devices or electromechanical cam devices.

16. The shifter assembly of claim 11, wherein the upper predetermined speed threshold is an upper vehicle speed threshold and the lower predetermined threshold is a lower vehicle speed threshold.

17. The shifter assembly of claim 11, wherein the upper predetermined speed threshold is an upper engine speed threshold and the predetermined speed threshold is a lower engine speed threshold.

18. The shifter assembly of claim 11, wherein the controller is configured to selectively actuate the gear blockout based on: (i) the upper predetermined speed threshold and a signal from a clutch position sensor or a shift lever position sensor indicative of an upcoming transmission shift, and (ii) the lower predetermined speed threshold less than the upper predetermined threshold and the signal from the clutch position sensor or the shift lever position sensor indicative of the upcoming transmission shift.

* * * * *